US005250941A

United States Patent [19]

McGregor et al.

[11] Patent Number: 5,250,941

[45] Date of Patent: Oct. 5, 1993

[54] CUSTOMER ACTIVITY MONITOR

[76] Inventors: Peter L. McGregor; Lily Cohen-Miller, both of 14 Beaufort, D.D.O., Quebec, Canada, H9A 2M6

[21] Appl. No.: 742,879

[22] Filed: Aug. 9, 1991

[51] Int. Cl.[5] .............................................. H04Q 1/00

[52] U.S. Cl. .................................. 340/825.65; 377/6; 377/52

[58] Field of Search .................. 340/825.65, 555, 556, 340/933, 942, 286.06, 870.39, 825.15, 825.22, 825.55; 377/6, 32, 20, 52, 37; 364/401

[56] References Cited

U.S. PATENT DOCUMENTS

| | | | |
|---|---|---|---|
| 3,727,034 | 4/1973 | Pope | 377/6 |
| 3,808,410 | 4/1974 | Schlesinger | 377/6 |
| 4,285,483 | 8/1981 | Cipollone | 377/20 |
| 4,700,295 | 10/1987 | Katsof et al. | 364/401 |
| 4,799,243 | 1/1989 | Zepke | 377/6 |
| 4,831,638 | 5/1989 | Dabby et al. | 377/6 |
| 4,967,608 | 11/1990 | Yost | 377/14 |
| 5,047,962 | 9/1991 | Cornish | 377/6 |

*Primary Examiner*—Donald J. Yusko
*Assistant Examiner*—Edwin C. Holloway, III
*Attorney, Agent, or Firm*—Colucci & Umans

[57] ABSTRACT

A customer, automobile or other moving entity is monitored by sensing the presence of the entity to generate a signal. The signals are correlated with individual increments of time during an extended time period of days or months. Each signal may represent the count of a single individual or car, or the amount of time the individual or car is in the range of the sensor. The data is collected in a digital memory for the prolong periods of time and can be dumped to a personal computer in the form of a spreadsheet compatible file for future analysis. A unitary battery powered version of the invention includes a power saving circuit while another version of the invention, powered by a wall outlet, can be connected to multiple sensors for collecting data in a large environment such as a store.

11 Claims, 2 Drawing Sheets

CUSTOMER ACTIVITY MONITOR

FIELD AND BACKGROUND OF THE INVENTION

The present invention relates in general to monitoring systems for counting entities, whether they are customers in a store, automobiles at a border crossing between countries, or other moving individuals or objects in a variety of environments. In particular, the invention provides a monitor and method for counting entities at a plurality of locations and for correlating the count with a time frame. The data is stored as DIF files for use in a spreadsheet computer program for future analysis. The invention also includes a battery operated, power saving sensor assembly with a sensor which can be programmed for different modes of operation, for example, an active mode where the passage of an individual is registered as a count, or a dwell mode which measures the time individuals remain in a certain area. A single assembly is also connectable to multiple sensors which are individually programmable and positionable at different locations in an environment.

U.S. Pat. No. 3,727,034 discloses a system which can count the movement of people at a plurality of locations. Two sensors in series are provided at each location so that the direction of movement is also sensed. This system is used in particular for counting the number of people getting on and off a bus and has no mechanism for correlating the count with a time frame, no circuitry with a power saving feature, no teaching of the storage of data as DIF files and no programming for sensor modes.

U.S. Pat. No. 3,808,410 discloses a method of counting customers near the check out area of a store for the purpose of providing the store manager with information on whether too many or too few check out facilities are being made available. This reference does correlate the customer counting function with store management, but does not store the data as DIF files, or have battery powered sensors with a power saving feature or mode selection techniques for different sensors in the store.

U.S. Pat. No. 4,700,295 correlates a bank customer count with time during the day and contemplates maintaining these records for long periods of time for statistical analysis. Mechanisms are also provided for measuring the time a customer spends at a teller window. Although a back-up battery is mentioned for the clock/calendar, and a microcomputer is contemplated as the programming and data retrieval mechanism, this reference does not include battery powered sensors with a power saving feature nor programmable sensors, nor the use of DIF files for storing the data.

U.S. Pat. No. 4,799,243 contemplates the use of a thermal or infrared detector for detecting the presence of an individual, in a system which determines whether an individual is entering an area, leaving an area or waiting in an area. This is used to schedule the operation of an elevator. Aside from the acknowledgement that infrared detectors are used for detecting the presence of people, this reference is missing the salient features of the present invention.

U.S. Pat. No. 2,951,737 discloses an electromechanical recording device for counting automotive traffic occurring during selected time periods. The recording is made by a pen which draws an analog graph on a disc shaped chart which is rotated by an analog clock. The traffic count is represented by the length of a radial mark written on the chart. This reference does not utilize digital processing means and is thus incapable of direct communication with a digital CPU.

SUMMARY OF THE INVENTION

The invention comprises a comprehensive system for counting entities, such as customers in various locations in a store, and for compiling this data as DIF files in a spreadsheet environment for future analysis. The count is correlated with selected time intervals (e.g., one hour) throughout the day.

The invention includes a battery operated, power saving sensor assembly which includes sensing and memory features and which can be accessed by a personal computer over a cable or telephone line for retrieving data stored over a period of time, for example, up to two months.

The invention uses sensors which can be programmed for different modes of operation, for example a time active mode where the passage of each individual is registered as a count, or a dwell time mode where the time an individual remains in a certain area is recorded. Both modes may also be active at the same time.

The invention also includes the capacity for programming different sensors at different locations for operating under different modes to further enrich the database being compiled. Another embodiment of the invention includes a single data storage device which is connected to several (e.g., eight) sensors.

Other entities which can be counted according to the present invention are automobiles. Automobiles crossing a border between countries, for example, can be correlated with time periods during the day and night to compile a statistical profile for customs and other government purposes.

The invention is adapted to use a wide variety of commercially available sensors including outdoor sensors which are designed for a wider temperature tolerance and weather tight construction compared with indoor sensors. In particular, the present invention utilizes infrared sensors but other sensors are also appropriate such as photobeam sensors, magnetic contact-closure and proximity switches, pressure mats and the like.

Accordingly, an object of the present invention is to provide sensor means responsive to the presence of an entity for generating a signal; clock means for measuring the passage of time; digital data processing means connected to the sensor means and to the clock means for correlating each signal from the sensor means with time as measured by the clock means; and digital storage means connected to the data processing means for storing each correlated signal as data for use in analyzing the presence of entities at the sensor means.

A further object of the present invention is to provide a monitoring arrangement which includes connection means for connecting the digital processing means to a PC for receiving the data and for processing the data as a spreadsheet compatible file, for example, a DIF file.

A still further object of the present invention is to provide the data processing means, the sensor means, the clock and the storage means in a single battery powered unit including a power saving feature.

Another object of the present invention is to provide a plurality of sensor means connected to the data processing means, with each sensor being programmable for a different mode of operation, for example a mode where each signal represents the counting of one entity, another mode where two signals represents the counting of one entity (corresponding to an entry and exit of a single person), a mode where the dwell time of the entity in the vicinity of the sensing means is determined, and a still further mode where signals from each sensor means is processed as a percentage of the total signals from all sensor means.

A still further object of the invention is to provide an entity monitoring method utilizing the apparatus and programming of the present invention.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiments of the invention are illustrated.

DESCRIPTION OF THE PREFERRED EMBODIMENTS

Figure 1:
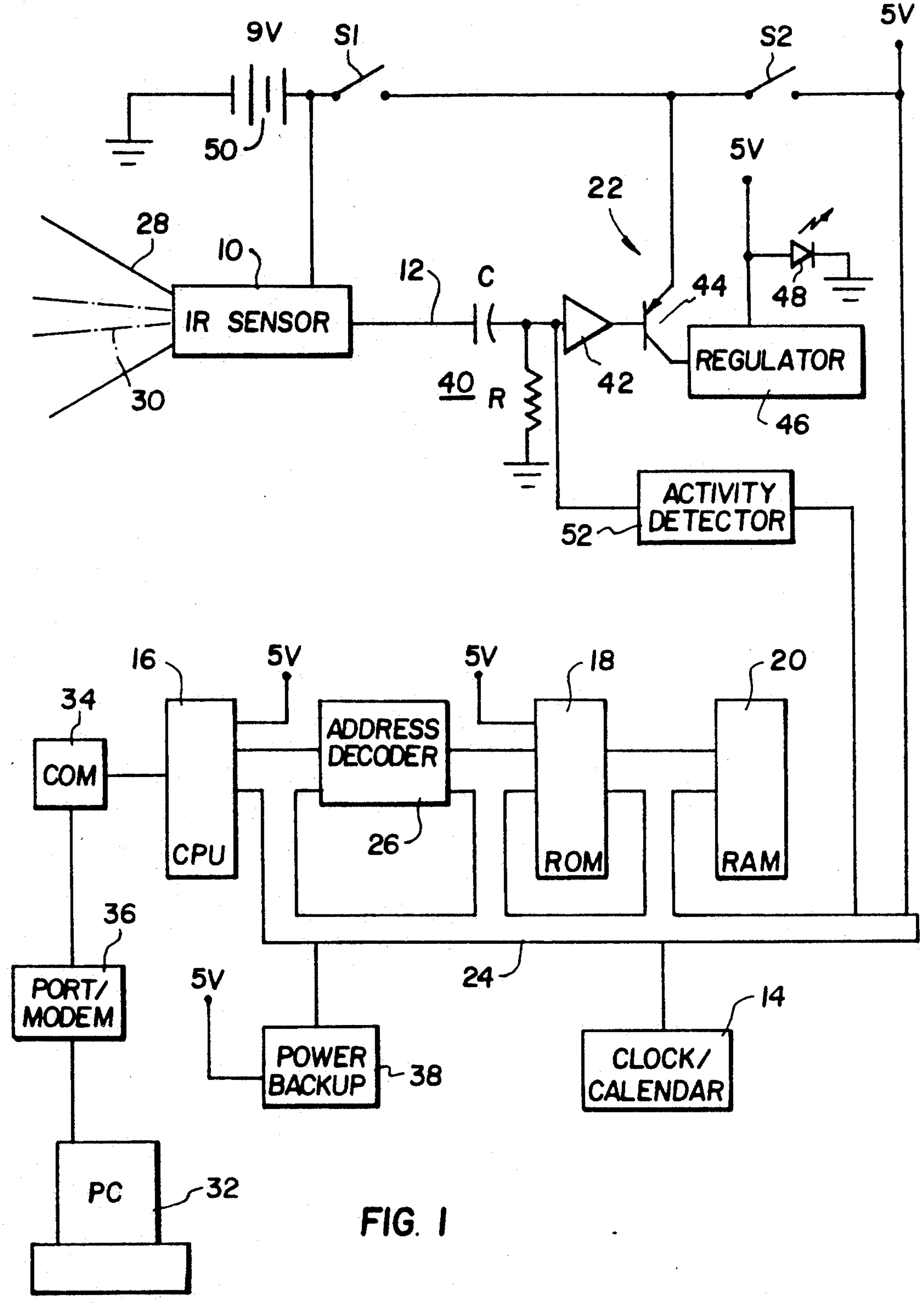
FIG. 1 is a schematic block diagram illustrating one embodiment of the invention.

Referring to the drawings in particular, the invention embodied in FIG. 1 comprises an entity monitoring arrangement which includes a sensor 10, for example, an infrared or IR sensor particularly adapted for sensing the presence of individuals. Other sensors for sensing other entities such as automobiles may replace sensor 10. Sensor 10 is responsive to the presence of an entity by generating a signal on line 12 connecting the sensor to power saving means generally designated 22 which converts the signal into a clean five volt pulse connected at all locations labelled 5 V in FIG. 1.

The arrangement also includes clock means 14 in the form of a clock and calendar combination which is capable of measuring time on an ongoing basis and providing the time measurement in the form of an hour:minute:second measurement and a day/month/year measurement.

The arrangement also includes digital data processing means in the form of a CPU 16 which is connected to the sensor through the power saving means 22 and to the clock 16 through a bus line 24.

Data in the form of time correlated signals received from the sensor 10 and correlated with a time measurement from the clock 14, are stored in digital storage means exemplified by a read-and-write memory or RAM 20. All signal conditioning and time correlating functions are achieved by firmware stored in a read-only memory or ROM 18.

Communication between CPU 16 and ROM 18 is established through an address decoder 26 with the CPU, the ROM and the RAM being connected to the bus 24.

The firmware in ROM 18, which forms part of the digital data processing means of the invention, include selection means in the form of subroutines for programming or conditioning the signals from sensor 10 according to different desired modes of processing for the signals. One mode assigns each signal to equal one count. In the environment of a retail store where sensor 10 is positioned at a location of interest, such as a counter having a particular display, the one signal per count mode indicates the number of customers who approach the particular counter.

Another mode of operation assigns two signal pulses for each count. This "divide-by-two" mode is useful when the sensor is at a common entrance/exit to the store. In this programmed mode of operation, the total count signifies the total number of customer who entered and then presumable left the store (each single customer triggering the sensor twice).

Another mode of operation programmed into ROM 18 is a dwell-time mode which either measures the time spent by a customer in a particular area (as evidenced by the sensor signal) or overall activity in the vicinity of the sensor due to multiple customers entering and leaving the sensors detection pattern. The mode to be selected somewhat depends on the sensor type. One sensor type has a wide angle pattern shown in top plan view at 28 in FIG. 1. The horizontal angle is approximately 85° with a 180° vertical angle (not shown). The sensor is capable of covering an area of approximately 40 feet by 40 feet and is particularly suited for the dwell-time mode. For the count modes (whether in the divide-by-one or by-two versions) a curtain pattern 30 is utilized having a small horizontal angle shown in top plan view in FIG. 1, and a broad, 180° vertical angle (not shown). This produces a relatively flat curtain or fan pattern through which a customer or entity passes to trigger the sensor signal on line 12.

RAM 20 contains a multiplicity of bins, each representing one hour of every day during a two month period. The bins are divided into separate registers, one used during the first month and the other used during the second month. The portable battery operated data collection unit of the invention shown in FIG. 1, is meant to be wall mounted with the sensor facing an area of interest. The entity count (despite the mode programmed) is stored in each bin, thus correlating the count to a particular hour, day, month and year. Although one hour increments are utilized in the preferred embodiments of the invention, any other suitable time increment is appropriate.

The unit is designed for removal from the wall after a two month period during which data has been accumulated in RAM 20, and connection to a personal computer or PC 32 for dumping the data. During the first month, the first register is filled with data and during the second month, the second register is filled with data. If the unit remains in place beyond the two month period, the contents of the first register is overwritten with new data (being collected during the third month). Accordingly the unit will contain data for the last two months of operation.

Data is retrieved from the monitoring unit by connecting CPU 16 to PC 32 through a communications port or COM 34 and either a cable or cables plus modems 36. COM 34 which is plugged or wired to CPU 16, is designed to handle R32 communications and serial protocol. COM 34 may for example an RJ11 plug and RS232 hardware.

To access, program and retrieve data from the monitoring arrangement of the invention, PC 32 is programmed with software that also forms part of the invention. The software has been designed to retrieve the contents of the bins in RAM 20 in DIF format which is compatible to a variety of spreadsheet computer programs including Lotus 1-2-3, Excel, Q & A, Symphony and dBase. this allows the user to analyze and display the data in a convenient and versatile spreadsheet environment.

When using the present invention in a store environment, a plurality of battery powered self contained arrangements can be mounted at various locations such as the entrances, particular counters, checkout facilities and the like, to analyze customer traffic throughout the store and throughout the day. Providing data for a two month period, periodic trends can be identified, such as extra activity every Saturday afternoon, and particularly attractive or unattractive displays can be discovered. By placing a sensor outside the store near the store window, passing potential customers can be counted and compared to customers who actually enter the store which are referred to as "hits". This may reveal other useful information such as a correlation between the number of "hits" and time of day or day of the week.

A particularly attractive and useful feature of the invention is the fact that all elements of the arrangement shown in FIG. 1, with the exception of the modem 36 and the personal computer 32 are mounted in a small plastic housing having a viewing window for the pattern 28 or 30 of sensor 10. The unit is powered by a 9 volt battery 50. Since the unit must be active for a relatively long period, power saving means 22 were engineered as part of the invention.

In operation, a main power switch S1 is closed immediately before the unit is mounted on the wall. Switch S2 remains open. Each time sensor 10 which is continuously powered by battery 50, detects the presence of an entity in its detection pattern, a sensor signal on line 12 is applied to an RC timing circuit 40. The resistor R and capacitor C of RC circuit 40 is selected to provide a 100 millisecond ramp during which the sensor signal 12, amplified by an amplifier 42, is applied to the base of a transistor 44 which forms power saver switch means of the invention. This makes the transistor conductive which applies 9 volts from the battery 50 to a regulator 46 which outputs a constant 5 volt pulse 5 V which is applied to the data processing and storage means. Regulator 46 thus acts as power distribution means for the rest of the self-contained portable data collection unit. At the same time, an LED 48 is activated to provide a visual indication. The 5 volt pulse is only active during the 100 millivolt ramp established by the RC circuit 40. If signal processing finishes before completion of the 100 millivolt ramp, additional energy is saved by truncating the ramp and dropping the signal being applied to amplifier 42, to zero. This is done using a data processing detector 52 which is connected between the input of amplifier 42 and the bus line 24. When detector 52 senses a turn off pulse on bus 24, signifying the end of data processing, a transistor (not shown) in detector 52 is made conductive to change the time constant of RC circuit 40 and effectively end the 100 millisecond ramp. Usually, a count can be processed in approximately 20 milliseconds.

Although sensor 10 is directly connected to battery 50 and thus draws current constantly, the commercially available sensors used in the present invention only draw 2 microamps. For this reason the 9 volt battery is more than adequate to keep the unit powered for multiple two month monitoring periods.

For the dumping of data into PC 32, constant powering of the data processing and storing elements are needed. During this process, therefore, switch S2 is closed and the power saving assembly 22 is by-passed.

The software in PC 32 includes subroutines for programming the entity monitoring arrangement of the present invention. This includes subroutines for selected the mode for signal conditioning, setting the clock/calendar 14, entering phone numbers for modem communication, setting passwords where the data may be dumped only to authorized individuals, and the viewing of data to be dumped.

The embodiment of FIG. 1 also includes a power back-up 38 which contains a lithium battery (not shown) to maintain the data in RAM 20 in case power is lost or when battery 50 is changed. With a removed or weak battery 50, the normal 5 volt pulse 5 V drops to below 5 volts. A comparison is made between the lithium battery voltage and the 5 volt pulse in power back-up 38 and if this comparison indicates a subvoltage pulse, communication is established between power back-up 38, CPU 16 and RAM 20 to stop all signal processing and hold the values in RAM 20.

Figure 2:
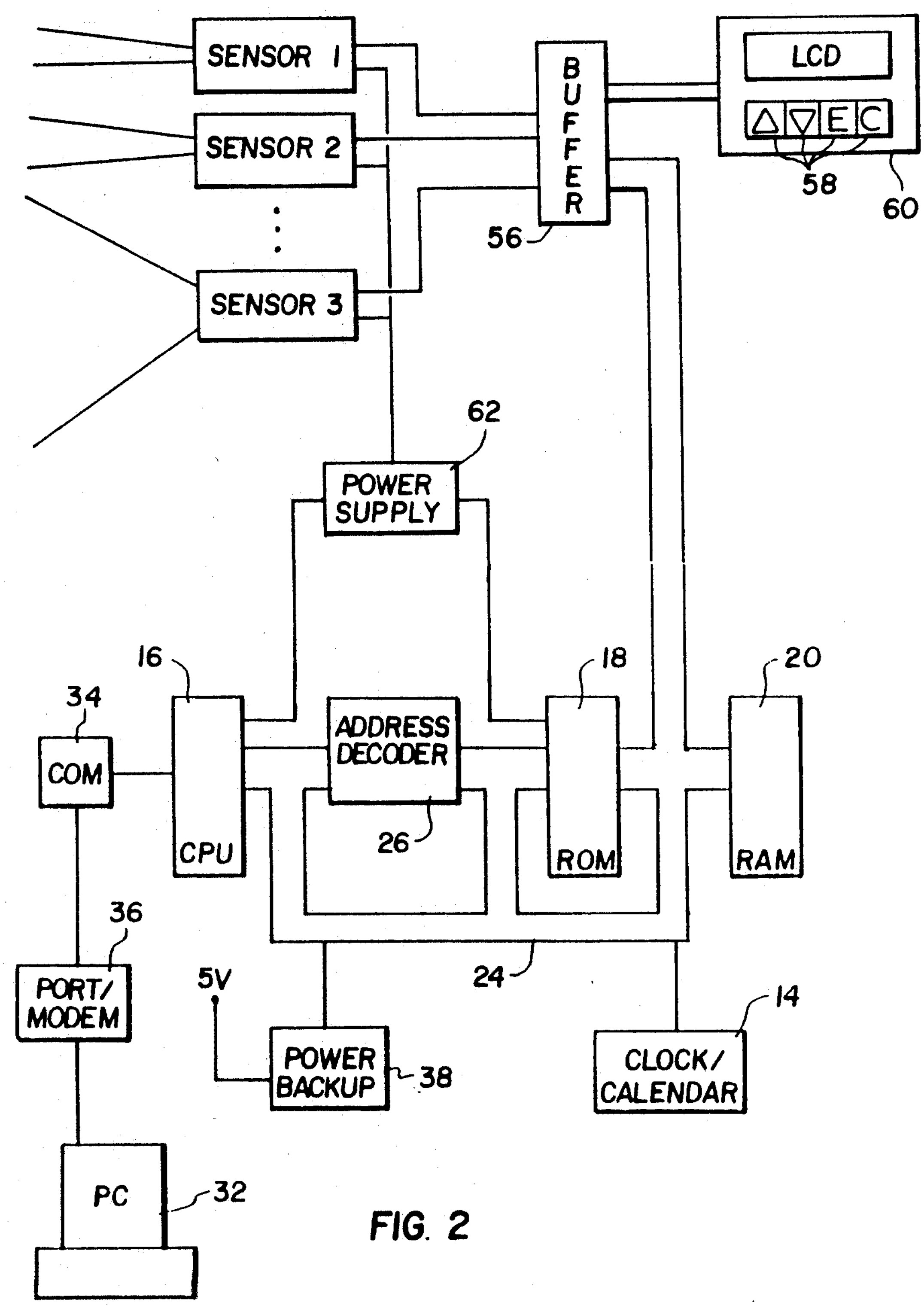
FIG. 2 s a view similar to FIG. 1 illustrating a second embodiment of the invention.

The various functions, in addition to data dumping which can be achieved remotely through the PC in the embodiment of FIG. 1 can be achieved using four on board buttons and an LCD or liquid crystal display included in the embodiment of FIG. 2. In FIG. 2, the same reference numerals are utilized to designate the same or functionally similar parts and their description will not be repeated. The elements in FIG. 2 which require power, receive it from power supply 62 which is attached to an electrical outlet. Unlike the embodiment of FIG. 1, the monitor of FIG. 2 includes a plurality of sensors. Of those, three sensors, 1, 2 and 3 are illustrated, the preferred embodiment of the invention includes eight sensors. Additional or fewer sensors are contemplated.

The sensors provide their signals to a buffer 56 which sends the signals in an orderly fashion to the data processing and storage elements 16, 18 and 20. RAM 20 includes memory for receiving tagged or separately stored time correlated signals from each of the sensors. As with the use of multiple monitors of FIG. 1 at different strategic locations in a store or other environment, the multiple sensors in FIG. 2 can be strategically located for meaningful data acquisition.

Unlike the embodiment of FIG. 1, the embodiment of FIG. 2 is programmable on board without requiring the externally connected PC 32. This is achieved through a user module 16 which includes a liquid crystal display LCD and four function buttons 58. The first button when pressed increments the LCD upwardly through a menu of multiple functions. The same menu can be incremented downwardly with the second button. Once a menu entry with a desired function is reached, its function is entered using the third enter key E. Additional options are then made available. Once entered into a menu option, the option can be exited using the clear key C which returns the LCD to a status screen which lists each of the active sensor by a separate numeral, for example, 1, 2 and 3.

The important menu functions are "display the sensor information" which displays the sensor information for a selected sensor. Another function is "view and change the real-time clock" which sets the clock 14. A beeper (not shown) can also toggled between an on and off condition. Security codes can be viewed and changed and each sensor can be individually programmed for a different mode of operation. Sensors 1 and 2 are narrow beam or curtain sensors while sensor 3 is an area sensor. Accordingly, sensors 1 and 2 are appropriately programmed in one of the count modes while sensor 3 is appropriately programmed in a dwell mode. A percentage mode is also available in the embodiment of FIG. 2 which stores the activity of each sensor as a percentage of the total sensor activity across all the sensors. Each sensor may also be programmed with a location code so that an individual viewing the sensor information can know where the sensor is located in a multisensor environment. A self test routine can also be accessed through the menu.

The firmware in ROM 18 in the embodiment of FIG. 2 includes a modem access window which allows communication with the monitor only during selected times, for example, during late night or early morning hours before the store is open. This avoids losing data by inadvertently accessing the monitor during busy times of the day.

Although the preferred embodiments of the invention have been described in connection with a store environment, the present invention is very useful for a wide variety of different purposes. Governments may utilize the portable or outlet powered embodiments of the invention to sense the passing of automobiles or individuals at border crossings to generate easily accessible data for all periods of the day and night. This data is accessible from remote locations using the PC 32 and modem 36. For areas without available power, the self powered version of the invention is particular useful for collecting intelligent information over long periods of time and thereafter processing the information in a convenient spreadsheet environment.

While specific embodiments of the invention have been shown and described in detail to illustrate the application of the principles of the invention, it will be understood that the invention may be embodied otherwise without departing from such principles.

What is claimed is:

1. An entity monitoring arrangement comprising:

a sensor responsive to the presence of an entity for generating a signal;

clock means for measuring the passage of time;

digital data processing means connected to said sensor and to said clock means for correlating each signal from said sensor with time as measured by said clock means;

digital storage means connected to said data processing means for storing each correlated signal as data;

a battery; and power-saving means connected to said sensor and between said battery and said data processing and storage means for applying power to said data processing and storage means only during a time period immediately after said sensor generates a signal, and for disconnecting power from said data processing and storage means at all other times, said battery being connected to said sensor at all times for powering said sensor continuously.

2. An entity monitoring arrangement according to claim 1, wherein said sensor, said clock means, said data processing means, said data storage means, said battery and said power-saving means are mounted together in a single portable battery-powered unit.

3. An entity monitoring arrangement according to claim 2, wherein said power-saving means comprises a timing circuit connected to said sensor and said battery for beginning a time period for receiving a sensor signal during which said battery is connected to said data processing and storage means for powering said data processing and storage means.

4. An entity monitoring arrangement according to claim 3, wherein said power-saving means includes power-saver switch means connected to said timing circuit for being closed during said time period, and for being opened after said time period, said power-saving means including power distribution means for supplying power to said data processing means and to said storage means, said power-saver switch means being connected to said battery and to said power distribution means so that when said power-saver switch means is closed, said power distribution means receives power from said battery, and when said power-saver switch means is open, said power distribution means does not receive power from said battery, said sensor being directly connected to said battery for continuously receiving power from said battery.

5. An entity monitoring arrangement according to claim 4, wherein said data processing means includes means for operating in at least two modes, a first one of said modes counting each signal from said sensor as a single count of an entity, and a second one of said modes counting every two signals from said sensor as a single count of an entity, said data processing means including selection means to select operation of said sensor in only one mode, the entity monitoring arrangement comprising a plurality of said portable battery-powered units each selectively operable by said selection means in either said first or said second mode for collecting data at a plurality of self-contained locations.

6. An entity monitoring arrangement according to claim 3, including truncation means connected to said timing circuit and to said data processing and storage means for detecting the end of data processing and thereupon canceling a remainder of the time period to immediately disconnect the battery from the data processing and storage means.

7. An entity monitoring arrangement according to claim 6, wherein said power-saving means includes power-saver switch means connected to said timing circuit for being closed during said time period, and for being opened after said time period, said power-saving means including power distribution means for supplying power to said data processing means and to said storage means, said power-saver switch means being connected to said battery and to said power distribution means so that when said power-saver switch means is closed, said power distribution means receives power from said battery, and when said power-saver switch means is open, said power distribution means does not receive power from said battery, said sensor being directly connected to said battery for continuously receiving power from said battery.

8. An entity monitoring arrangement according to claim 7, wherein said data processing means includes means for operating in at least two modes, a first one of said modes counting each signal from said sensor as a single count of an entity, and a second one of said modes counting every two signals from said sensor as a single count of an entity, said data processing means including selection means to select operation of said sensor in only one mode, the entity monitoring arrangement comprising a plurality of said portable battery-powered units each selectively operable by said selection means in either said first or said second mode for collecting data at a plurality of self-contained locations.

9. An entity monitoring arrangement, comprising:

a plurality of sensors, each responsive to the presence of an entity for generating a signal;

clock means for measuring the passage of time;

digital data processing means connected to each sensor and to said clock means for correlating each signal from each sensor with time as measured by said clock means;

digital storage means connected to said data processing means for storing each correlated signal as data; and said data processing means including mode selection means for conditioning signals from each sensor according to one of a plurality of different modes in which each sensor is responsive to the presence of an entity, said mode selection means conditioning each signal by one of; representing at least one signal as one entity count, and representing two signals as one entity count, and representing each signal as a dwell time value during which a respective sensor was responsive to the presence of an entity;

each sensor being separately operable at one of said modes by said data processing means.

10. An entity monitoring arrangement according to claim 9, including communication means connected to said data processing means for retrieving the data in a selected format which is compatible with at least one spreadsheet computer program for manipulating and displaying the data.

11. An entity monitoring arrangement according to claim 9, wherein said data processing means divides the time measured by said clock means into successive time increments of equal length and correlates each signal by identifying each signal with one of the increments.

* * * * *